(12) United States Patent
Inoue et al.

(10) Patent No.: US 6,294,760 B1
(45) Date of Patent: Sep. 25, 2001

(54) METHOD FOR CALIBRATING DISCHARGE HEAT ENERGY OF OPTICAL FIBER SPLICING DEVICE

(75) Inventors: Koichi Inoue; Katsumi Sasaki; Yosuke Suzuki; Noriyuki Kawanishi; Yukinari Tsutsumi, all of Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 09/531,181

(22) Filed: Mar. 21, 2000

(30) Foreign Application Priority Data

Mar. 25, 1999 (JP) .................................................. 11-081885
Mar. 25, 1999 (JP) .................................................. 11-081886

(51) Int. Cl.[7] .................................................. G02B 6/255
(52) U.S. Cl. .................................. 219/383; 385/97; 65/407
(58) Field of Search ....................................... 219/383, 384; 385/96–98; 65/407; 374/1, 45

(56) References Cited

U.S. PATENT DOCUMENTS

| 4,911,524 |   | 3/1990 | Itoh et al. |  |
|---|---|---|---|---|
| 4,948,412 | * | 8/1990 | Yamada et al. | 65/407 |
| 5,009,513 | * | 4/1991 | Onodera et al. | 385/96 |
| 5,638,476 | * | 6/1997 | Zheng | 385/96 |
| 5,648,007 | * | 7/1997 | Reslinger et al. | 219/483 |
| 5,897,803 | * | 4/1999 | Zheng et al. | 219/383 |
| 5,909,527 | * | 6/1999 | Zheng | 385/96 |

FOREIGN PATENT DOCUMENTS

| 690318 | * | 1/1996 | (EP) . |
| 740172 |   | 10/1996 | (EP) . |
| 60-195504 |   | 10/1985 | (JP) . |
| 05-150132 |   | 6/1993 | (JP) . |
| 8-313751 | * | 11/1996 | (JP) . |
| 10-274723 | * | 10/1998 | (JP) . |
| 12-98173 | * | 4/2000 | (JP) . |
| 95/24665 |   | 9/1995 | (WO) . |

* cited by examiner

Primary Examiner—John A. Jeffery
(74) Attorney, Agent, or Firm—Burns Doane Swecker & Mathis

(57) ABSTRACT

The object of the present invention is to provide a method of accurately calibrating discharge heat energy produced during fusion splicing of two optical fibers by heating the optical fibers arranged with the intentional fiber cladding axes offset; in order to achieve the object, the present invention provides a method of calibrating discharge heat energy used in the optical fiber fusion splicing device wherein a discharge heating energy is measured based on a change of the fiber cladding axes offset.

2 Claims, 6 Drawing Sheets

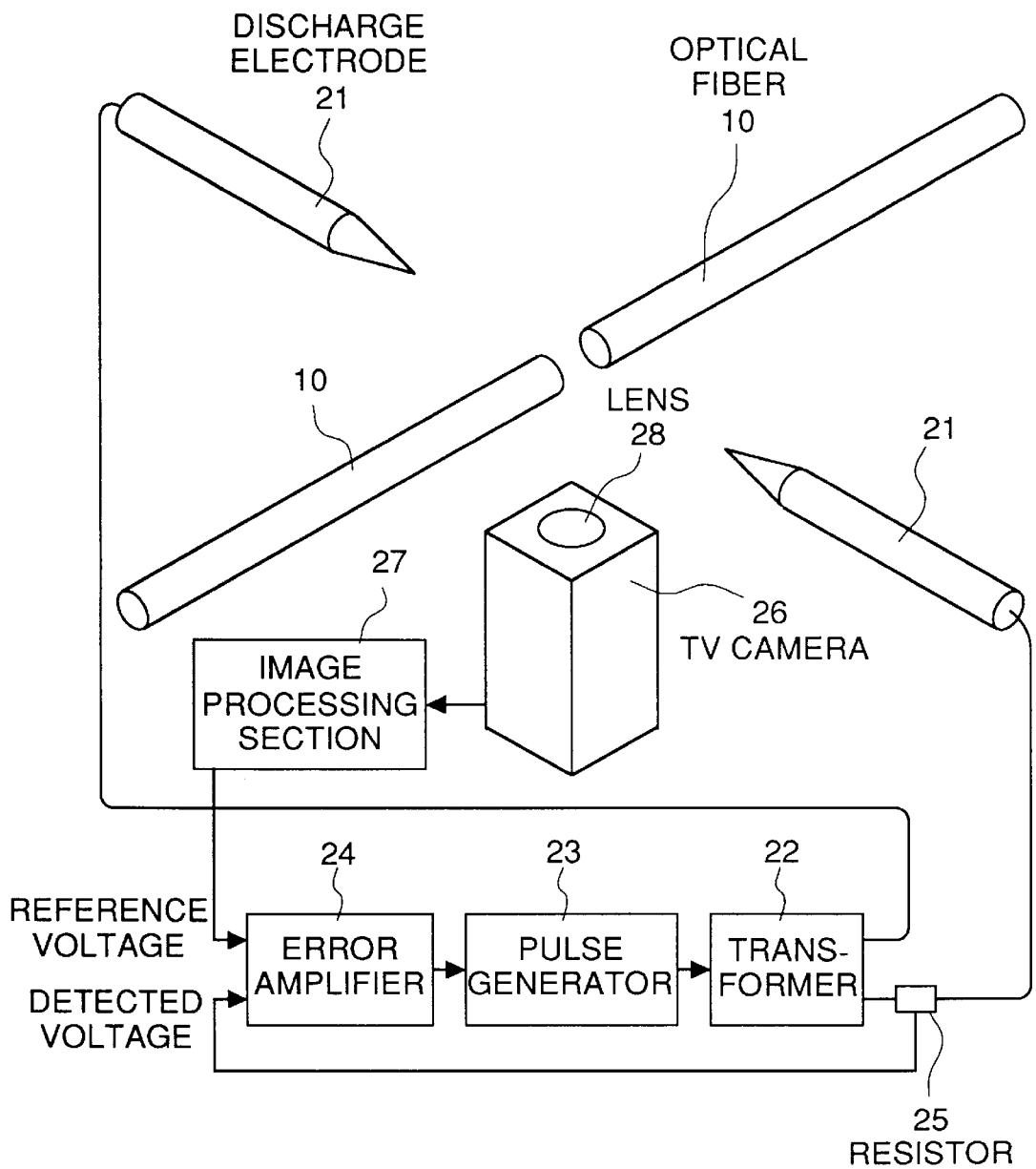

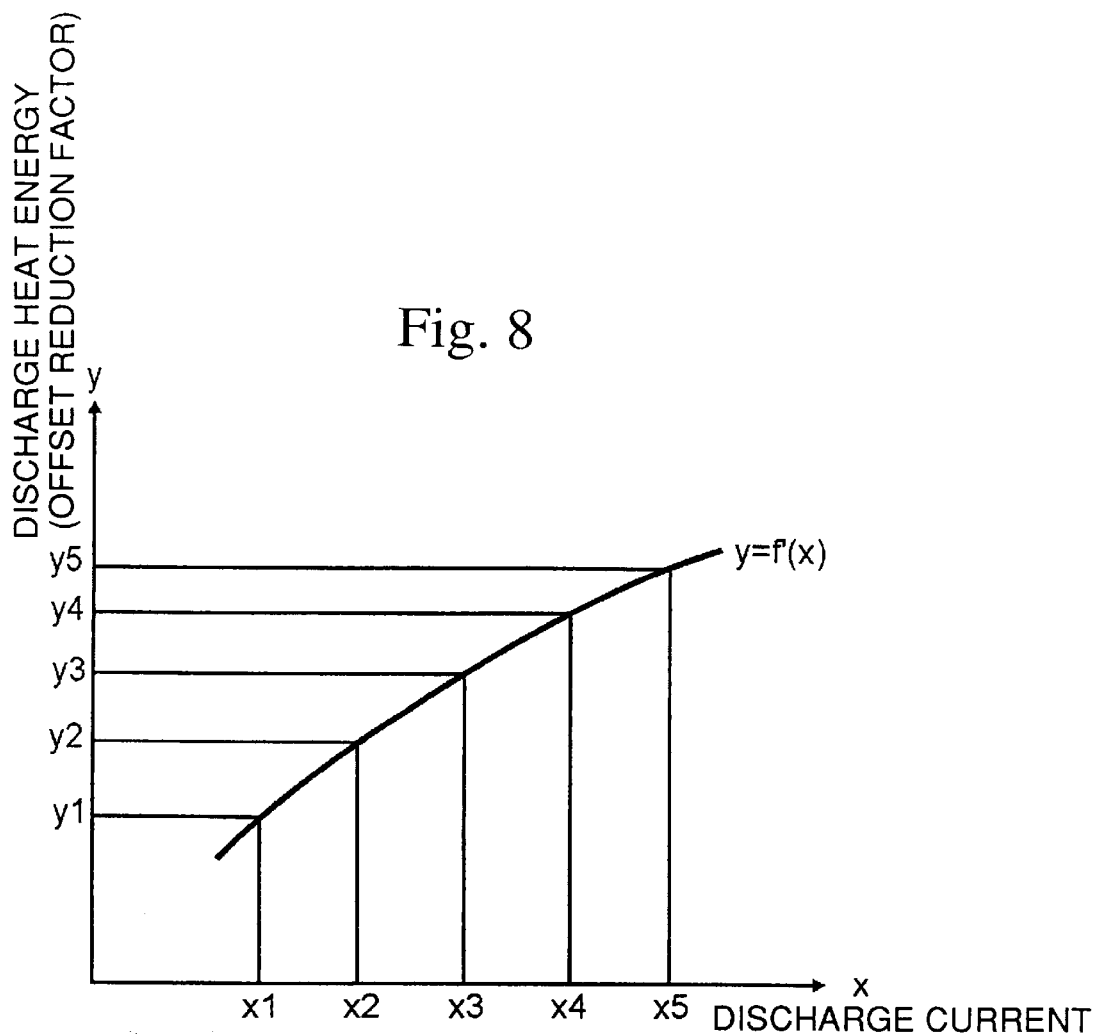

METHOD FOR CALIBRATING DISCHARGE HEAT ENERGY OF OPTICAL FIBER SPLICING DEVICE

BACKGROUND OF THE INVENTION

1. Field of the Invention

The present invention relates to a method for calibrating the discharge heat energy used in an optical fiber fusion splicing device which fuses and joins two optical fibers by heating due to electric discharge.

2. Description of the Related Art

In an optical fiber fusion splicing device, optical fibers ends are fused and joined by using high frequency discharge. When the optical fibers are fusion spliced using high frequency discharge, the minimum splice loss occurs at a particular discharge heat energy, as indicated in a graph shown in FIG. 1, which relates splice loss to discharge heat energy. Therefore, it is important to apply adequate discharge heat energy to minimize the splice loss.

In general, in a fusion splicing device of optical fibers, the discharge current is maintained at a given value while discharging, by a feed back control. The quantity of heat applied to the optical fibers can be controlled by adjusting a reference value of this feedback control current. The relation between the discharge current x and the discharge beat energy y can generally be represented by a relational expression $y=f(x)$, which produces curves such as the ones shown in FIG. 2, where the discharge current is shown on x-axis and the discharge heat energy is shown in y-axis.

However, it has been observed that even though the discharge current may be maintained at a constant, the quantity of heat applied to the optical fibers changes gradually with usage of the discharge electrode. This is because the relationship between the discharge current and the discharge heat energy is affected by the changes in the fusion parameters caused by such factors as glass deposition on the discharge electrode, wear of the discharge electrodes and changes in discharge paths. Because the changes in the condition of the discharge electrodes often causes a change of the electrical resistance between the electrodes, the heat energy changes with usage of the electrodes. In other words, the relationship between the discharge heat energy and discharge current changes as illustrated by a curve $y=f(x)$ in FIG. 2.

For this reason, although fusion splicing operation is carried out under a constant discharge current, actual heat applied to the optical fibers changes in practice, and splice loss often deviates from the initial splicing conditions aimed for minimum splice loss. That is, in the curve shown in FIG. 1, actual discharge heat energy applied optical fibers shifts from the minimum point.

To avoid such problems in producing a low-loss splice by fusion splicing, it is necessary to establish a constant discharge heat energy applied to the optical fibers. In order to maintain a constant discharge heat energy, it is necessary to calibrate the discharge heat energy by altering either the reference discharge current for feedback control or discharging duration.

This method of measuring the discharge heat energy is disclosed in a Japanese Patent Application, First Publication, Hei 5-150132, which is based on using dummy optical fibers before starting to weld the actual optical fibers to calibrate discharge heat energy by observing the state of fusion of the optical fiber ends.

The method of measuring the discharge heat energy will be explained with reference to FIGS. 5A–5C. First, the two optical fibers 10 are placed with a known gap L1, as shown in FIG. 5A. Next, as shown in FIG. 5B, discharge electrodes 21 are activated to generate a high frequency discharge to melt the ends of the optical fibers 10 while maintaining the relative positions of the optical fibers 10. The result is a fusion of the ends of the optical fibers 10 to cause them to retract to result in a gap of L2. The change of the gap (L2–L1), that is, retracting amount, is used to measure and calibrate the discharge heat energy generated during fusion splicing.

However, the extent of end retraction is affected by the degree of spreading of the discharge field. Therefore, the discharge heat energy measured according to the method described above, which is based on measuring the discharge heat energy according to the change of the ends gap of two optical fibers, does not give an accurate estimate of the discharge heat energy. For this reason, discharge heat energy data calibrated by the distance of end retraction do not coincide with the adequate discharge heat energy to achieve the minimum splice loss.

There is also a related patent that is an ECF function. To splice fibers having eccentric cores, if fusion splicing is carried out by aligning the central axes of the cores 11 (referred to as the core axes), as shown in FIG. 3A, the surface tension forces act on the end portions of the optical fiber to reduce the cladding axes offset of the opposing fibers 10. The resulting splice has a straight cladding axis, but the core axis has offset, as shown in FIG. 3B, and a higher splice loss is experienced by the core axes offset.

Therefore, there is a method of splicing, called eccentricity correct function (ECF) in which the self-aligning effects of the cladding axes caused by the surface tension forces on fused optical fiber are into account. In the ECF method, optical fibers 10 are aligned with intentional core axes offset of the optical fibers 10, as shown in FIG. 4A. The amount of the core axes offset of the optical fibers 10 caused by the self-aligning effect is calculated from the core eccentricities. Then, the optical fibers 10 are fusion spliced while maintaining this relative position of the optical fibers 10. Optical fibers 10 thus joined exhibits a cladding axes offset but the cores are straight as shown in FIG. 4B, thereby producing an optical fiber with good core alignment, and reducing the splice loss. The details of this technology are disclosed in a Japanese Patent Application, First Publication, Sho 60-195504.

SUMMARY OF THE INVENTION

It is an object of the present invention to provide a method of calibrating the discharge heat energy generated during the actual fusion splicing operation with high According to a first aspect of the present invention, a method of calibrating discharge heat energy used in the optical fiber fusion splicing device in which the discharge heating energy is measured and calibrated based on a change of the fiber cladding axes offset.

In the first method of the present invention, the fiber cladding axes offset is intentionally produced, the discharge heat energy is measured and calibrated. A change of the fiber cladding axes offset is not affected by the degree of spreading of the discharge field, as in the conventional methods. Therefore, it is possible to exactly measure the discharge heat energy.

According to a second aspect of the present invention, a method of calibrating heat energy used in the optical fiber fusion splicing device comprises the steps of:

abutting the two optical fibers with fiber cladding axes are offset;

performing discharge heating so as to produce a first fused joint exhibiting a residual axes offset;

subjecting the first fused joint to a series of successive additional discharge heating while the each discharge heat energy is measured at additional discharge heating process from on a change of the fiber cladding axes offset due to additional discharge heating.

According to the second method, the ends of the optical fibers are joined, and the fused joint is subjected to a series of additional heating steps. The change of the factors of the fiber cladding axes offset are measured and calibrated from due to a series of successive additional discharge heating. Therefore, when the change of the fiber cladding axes offset is concerned, the discharge heat energy can be measured on the same fused joint produced without being affected by the conditions of the optical fiber ends. Measured results are affected by the response of the optical fibers to the heat energy being applied presently, therefore, the results are more pertinent and precise. Also by repeating post-discharge heating on one fused joint, it is possible to obtain a number of measurements without conducting separated calibration cycle.

A fusion spliced joint having an fiber cladding axes offset may be heated additionally and successively under a constant level of additional heat energy so as to measure discharge heat energy after each additional heating to obtain an average value of offset reduction factors. By adopting such a procedure, discharge heat energy produced under a constant level of additional heat energy can be measured with precision within one calibrating cycle.

A fusion spliced joint exhibiting fiber cladding axes offset may be heated additionally and successively under a plurality of levels of additional heat energy so as to alter a level of succeeding additional heating to measure discharge heat energy after each change in the level of additional heating to obtain the plurality of levels of additional heat energy within one calibrating cycle.

A third aspect of the present invention, a calibrating discharge heat energy used in the optical fiber fusion splicing device comprises the steps of:

abutting two optical fibers with fiber cladding axes are offset;

performing discharge heating and observing results so as to calibrate discharge beat energy according to a change of fiber cladding axes offset between before and after splicing.

According to the third method, when fusing two optical fibers with fiber core eccentricity, fiber cladding axes offset is actually being observed after aligning the core axed offset. Discharge heat energy is measured by directly observing the change of fiber cladding axes offset. Also, because the ECF function produces intentional axed offset to compensate the axes offset back during a splice, it is only necessary to carry out the ECF method of splicing the optical fibers and measure the change of fiber cladding axes offset to calibrate the discharge heat energy that produced the splice. Therefore, the method is simple and is particularly useful for correctly calibrating discharge heat energy produced during the ECF method of splicing, when the fiber core has eccentricity.

BRIEF DESCRIPTION OF THE DRAWINGS

FIG. 6 is a block diagram to illustrate the splicing device to calibrate the discharge heat energy.

FIG. 8 is a graph of calibrating function y=f(x) obtained from the present invention.

DESCRIPTION OF THE PREFERRED EMBODIMENTS

Figure 1:
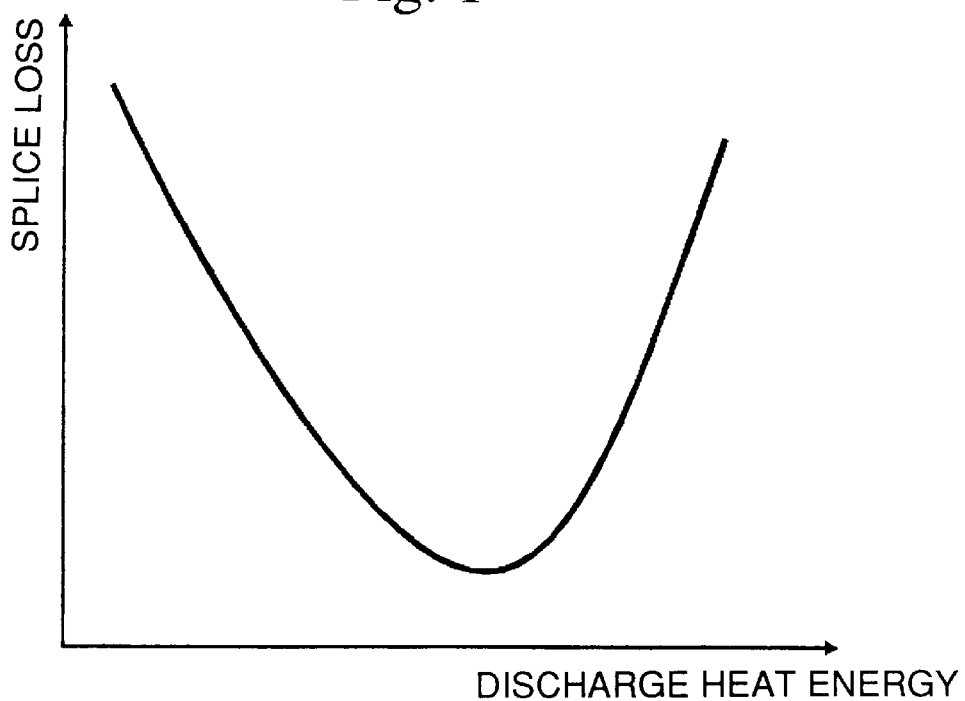
FIG. 1 is a graph showing a relationship between the splice loss and the discharge heat energy generated at the fusion splicing device.
Figure 2:
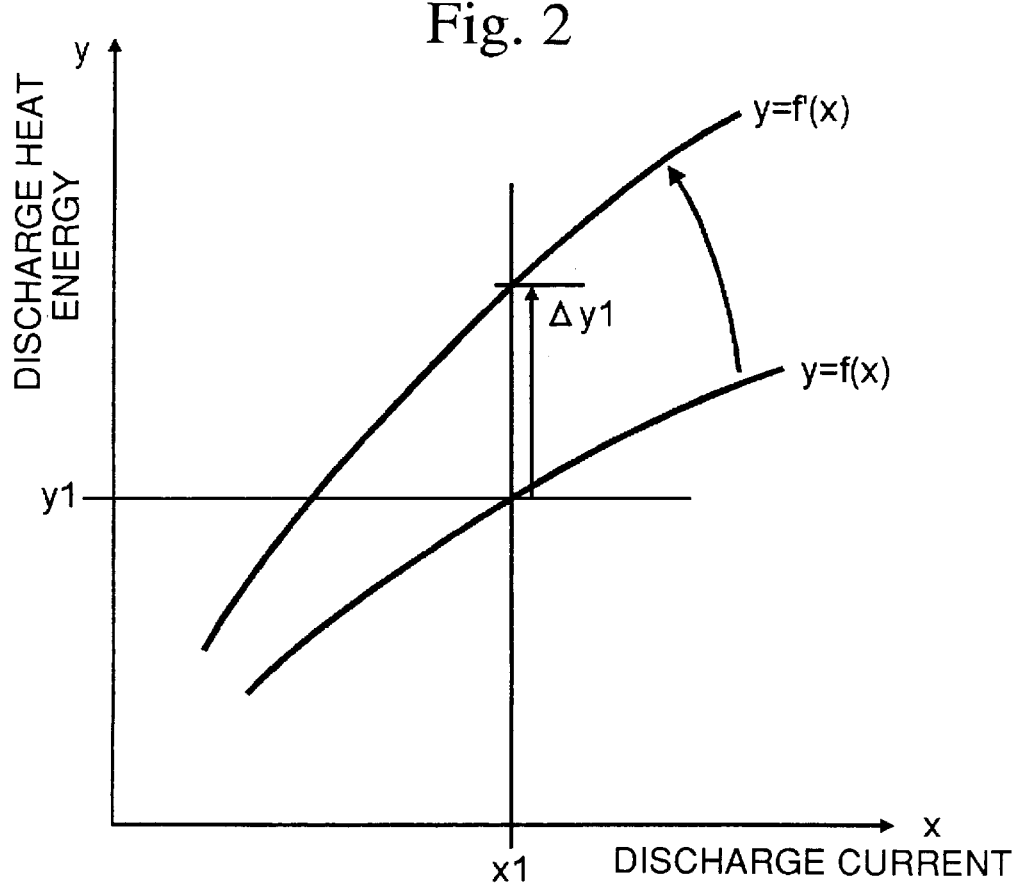
FIG. 2 is a graph showing a relationship between the discharge current and the discharge heat energy.
Figure 3A:
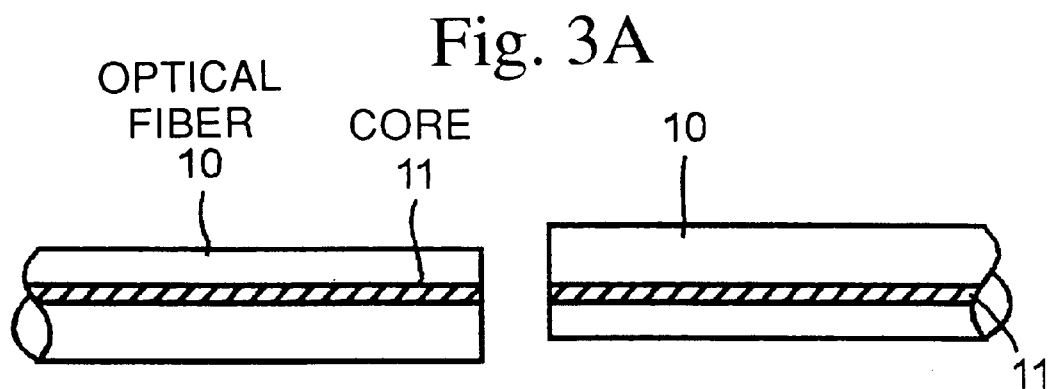
FIGS. 3A and 3B are illustrations of the known problems of core axes offset caused by eccentric cores.
Figure 3B:
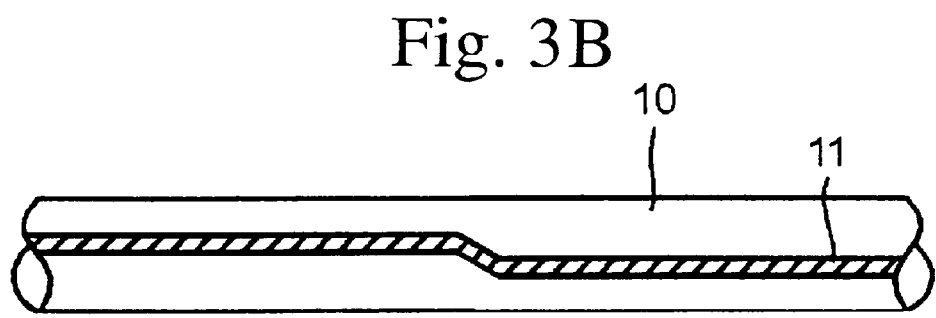
Figure 4A:
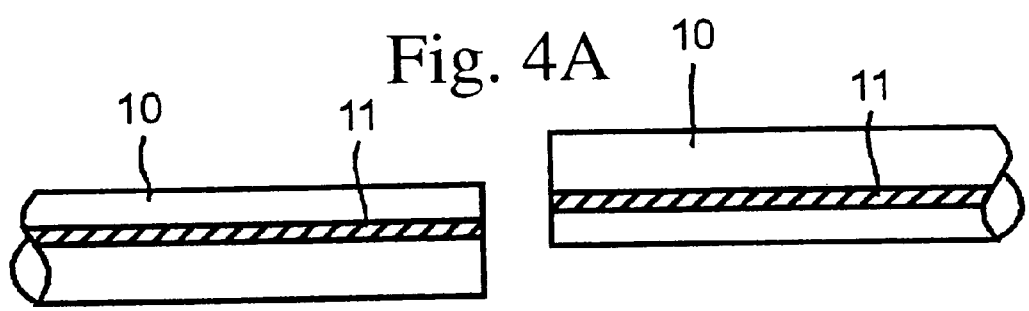
FIGS. 4A to 4B are illustrations of the process of fusion splicing using the ECF method.
Figure 4B:
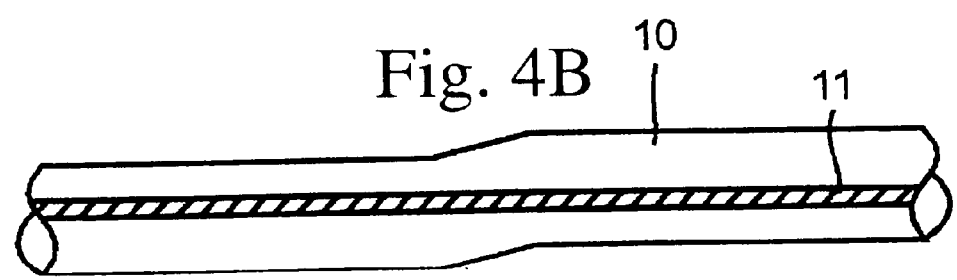
Figure 5A:
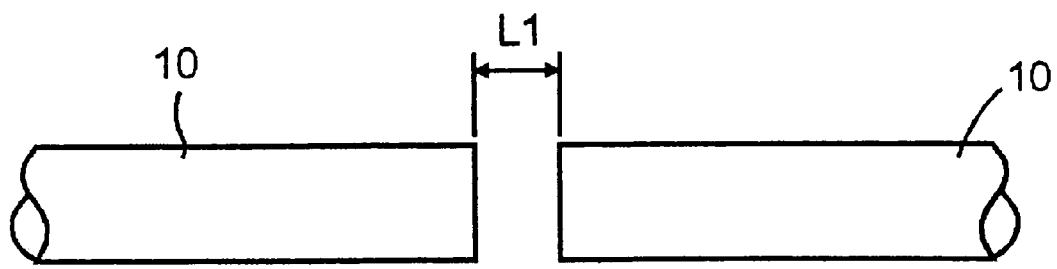
FIGS. 5A–5C are illustrations of the method of calibrating the discharge heat energy based on the extent of ends retraction.
Figure 5B:
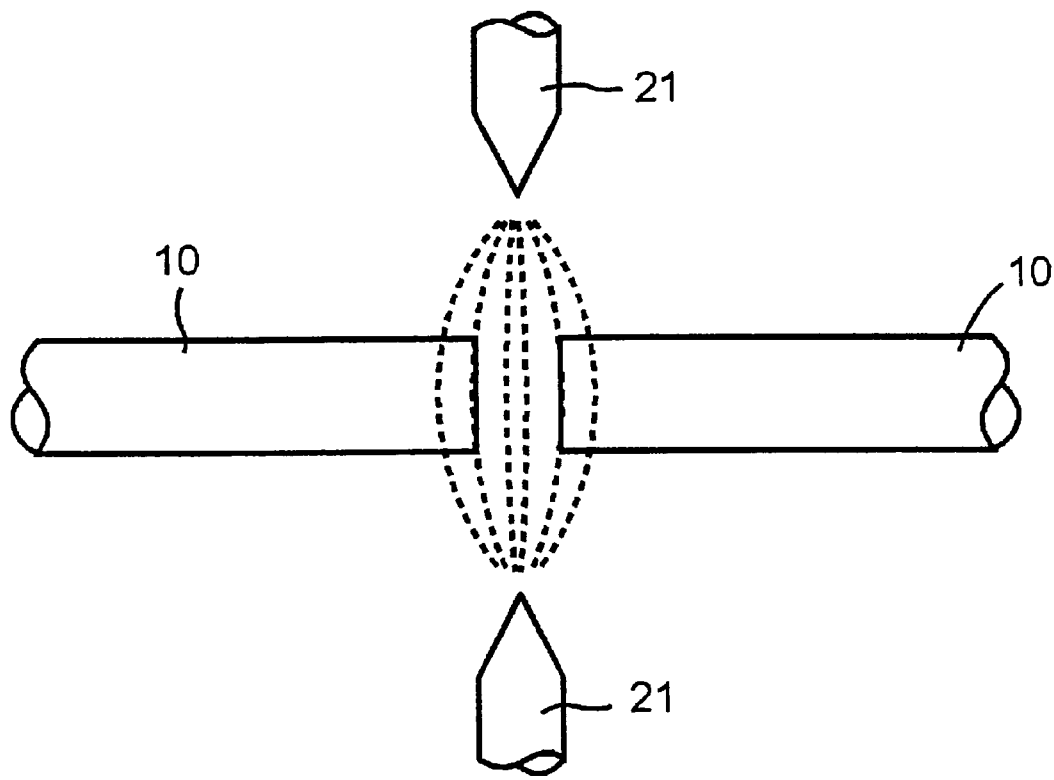
Figure 5C:
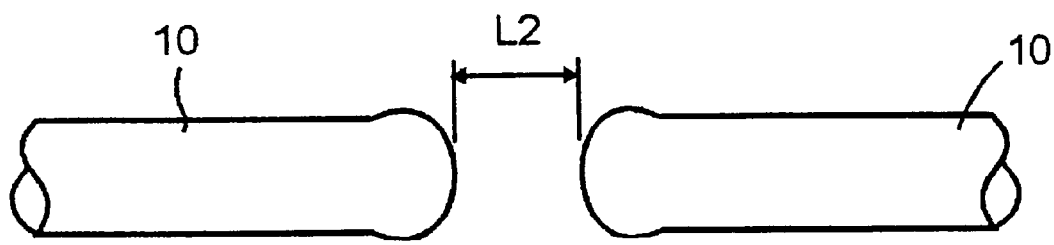

A method of calibrating the discharge heat energy of the optical fiber splicing device of the present invention will be explained with reference to the drawings.

As shown in FIG. 6, the optical fibers 10 were placed end to end (abutted) with the intentional cladding axes offset. Then, a high frequency discharge is generated between the discharge electrodes 21 to splice the optical fibers 10.

High frequency discharge was produced by generating high frequency pulses using a pulse generator 23, and applying the high frequency voltage to the primary coil of a step-up transformer 22, and the high voltage generated in the secondary coil was applied to the discharge electrodes 21 to generate a high frequency discharge between the discharge electrodes 21.

The fusion splicing device shown in FIG. 6 provides feedback control of the discharge current so that it matches a value specified by the reference voltage. A resistor 25 is placed in the circuit containing the discharge electrodes 21, and the voltage generated at the ends of a resistor 25 is detected. This detected voltage corresponds to the actual current flowing through the electrodes 21. A difference between the detected voltage and the reference voltage is obtained by an error amplifier 24. The pulse generator 23 is controlled to adjust the pulse width or pulse height according to the differential voltage. The feedback loop circuit is thus formed so as to eliminate the differential voltage between the detected voltage and the reference voltage and to match the actual discharge current to the current governed by the reference voltage.

Also, as shown in FIG. 6, a fusion splicing can be observed through a TV camera 26 with a lens 28. Imaging signals of the fused joint output from the TV camera 26 are processed by an image processing section 27. This method enables to correct the reference voltage automatically. It is also possible to manually adjust the reference voltage by an operator who is observing the splicing process on a monitor and the like through a TV camera 26.

Figure 7A:
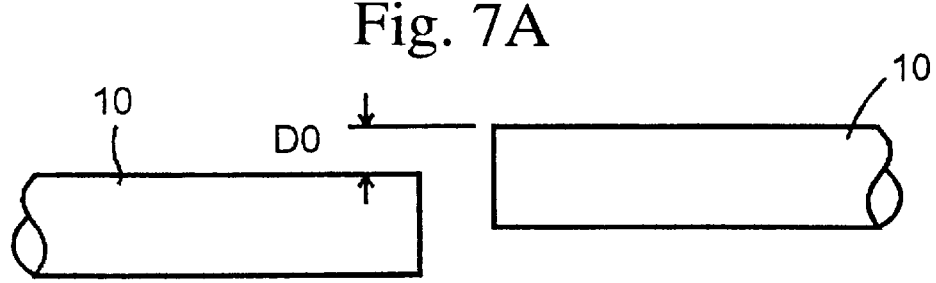
FIGS. 7A to 7E are schematic illustrations of the various stages of measuring cladding axes offset.
Figure 7B:
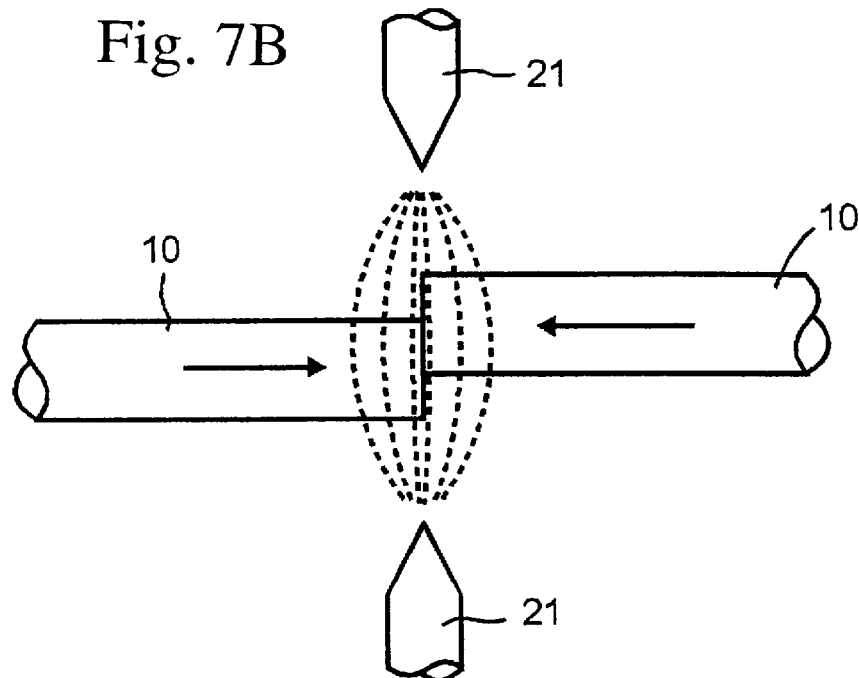
Figure 7C:
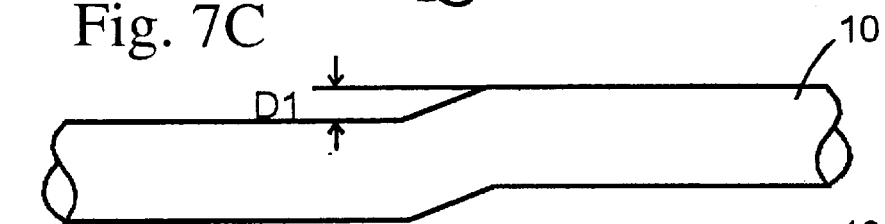

Next, the conditions of the optical fibers undergoing the fusion splicing process will be explained in detail with the use of FIGS. 7A to 7E. First, as shown in FIG. 7A, the optical fibers are aligned with the cladding axes offset D0. Next, as shown in FIG. 7B, discharge is generated between the electrodes 21, and while the end sections of the optical fibers 10 are being heated by the discharge, one or both optical fibers 10 to be fused as shown in FIG. 7C. The cladding axes are aligned itself by the surface tension force generated during fusion, and the cladding axes offset is reduced to D1.

Thus, the fused joint having a residual cladding axes offset, as indicated in FIG. 7C, is produced. After that, this fused joint is again heated using discharge heating. The discharge heat energy produced by fusion heating is calculated from an offset reduction actor produced by the second discharge heating. The calculation process of the offset reduction factor will be explained in detail below.

Figure 7D:
Figure 7E:
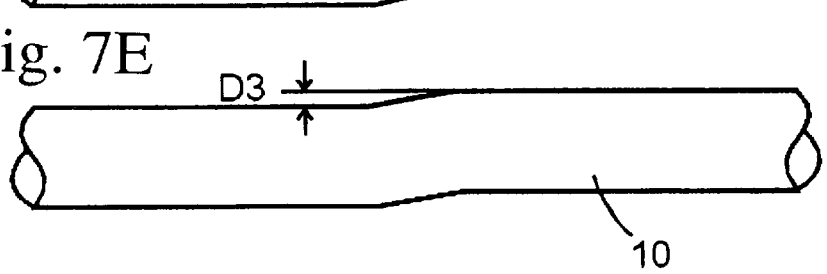

When the fused joint having a cladding axes offset D1 shown in FIG. 7C, is heated again, let us suppose that the offset is reduced to D2 as shown in FIG. 7D, and an application of additional heating further reduced the offset to D3 as shown in FIG. 7E. An offset reduction factors in the two additional heating can be expressed as $(D1-D2)/D1$ and $(D2-D3)/D2$, respectively.

That is, in general, when (n+1) additional heating is applied, the reduction factors are supposed to Dn and Dn+1 at heating n times and heating (n+1) times, respectively, for the dislocation reduction factor of the outer axes is given by a relational expression:

$$(D_n-D_{n+1})/D_n.$$

In other words, discharge heat energy in the method is obtained from the relational expression $(D_n-D_{n+1})/D_n$ for the offset reduction factor of the cladding axes.

When a optical fiber joint having an cladding axes offset which had been fused spliced is heated again, the joint is melted and the surface tension forces operate in such a way to eliminate the cladding axes offset. Therefore, it may be considered that the reduction in the offset is related directly to discharge heat energy. In other words, obtaining an offset reduction factor for the cladding axes caused by additional heating is equivalent to measuring the discharge heat energy directly and calibrating the discharge heat energy with high precision. That is, it means that discharge heat energy is a function of the offset reduction factor for the cladding axes.

It should be noted that the present method is based on observing the changes in the cladding axes offset caused by heating a fused point having a pre-existing intentional cladding axes offset. Therefore, comparing the present method with the method based on measuring the cladding axes offset between before and after splicing optical fibers 10 to calibrate the discharge heat energy, the present method of calibrating the discharge heat energy by measuring the offset of a prepared fused joint is less susceptible to the conditions of the optical fiber cleaved surface (angle, flatness, etc.), thereby enabling to calibrate the discharge heat energy with higher precision.

Moreover, when the offset reduction factor produced under a given set of operating conditions does not meet the reference value, in other words, discharge heat energy being produce does not agree with the initial setting of the fusion splicing device, it is possible to accurately adjust the discharge current so as to return to the initial setting that produced the initial fused joint. Particularly, by repeating additional heating many times, and adjusting the discharge current each time to obtain the reference value of the discharge heat energy, that is offset reduction factor, errors in correcting to obtain the reference value of discharge heat energy can be reduced significantly. This will be explained more fully in the following.

For example, suppose that the offset reduction factor of 0.10 is obtained when the reference discharge heat energy is y1, and further suppose that the discharge current to produce the reference discharge heat energy y1 has been pre-calibrated to be 12.5 mA.

First, the optical fibers are aligned so that the offset D0 for the cladding axes offsetting is 20 μm, and the optical fibers are fused to produce a joint with an offset D1 of 17 μm. This fused joint is again heated using a discharge current x1 of 12.5 mA, resulting in an offset D2 of 13.6 μm. In this case, the offset reduction factor is $(D1-D2)/D1=(17.3-13.6)/17.3=0.20$. The reference discharge heat energy y1 is supposed to produce an offset reduction factor of 0.10, therefore, an offset reduction factor of 0.20 means that the discharge heat energy being applied is excessive for the joint. It means that the discharge current x1 must be reduced for additional heating, so that for the next heating, the setting for the discharge current x1 is successively adjusted until the target value 0.10 for the offset reduction factor is obtained.

Accordingly, the present method enables to carry out additional heating process many times on one fused joint by successively adjusting the discharge current and calibrating the offset of cladding axes. Therefore, the process is not cumbersome and can be carried out relatively simply but accurately.

Additionally, such iterative process allows calibrate of discharge heat energy under different values of discharge current. For example, suppose that three reference discharge heat energy y1=0.10, y2=0.20, y3=0.30 correspond to discharge current setting at x1=12.5 mA, x2=13.5 mA, and x3=14.5 mA, one fused joint allows at least three attempts at correcting fusion splicing conditions.

Additionally, by repeating the process of additional heating, it is possible to obtain a calibrating function $y=f(x)$ under the operating conditions prevailing at that time. The process of obtaining the calibrating function will be explained in further detail below.

For example, a fusion joint is prepared using D0 at 20 μm which produces D1 at 17 μm. Additional heating is carried on this fused joint using a discharge current (x1) at 10 mA. Suppose that the offset reduction factor obtained as a result is 0.06, then the point (x1, y1) can be added to in a graph shown in FIG. 8. Next a second additional heating is carried out using 12 mA for a current x2, and if a dislocation reduction factor y2 obtained is assumed to be 0.10, and these two values define another point (x2, y2) in FIG. 8. Similarly, further additional heating can be carried out such that a third additional heating with 14 mA for a current x3 produces a dislocation reduction factor y3 of 0.15; a fourth additional heating with 16 mA for a current x4 produces a dislocation reduction factor y4 of 0.21, and a fifth additional heating with 18 mA for a current x5 produces a dislocation reduction factor y5 of 0.27.

These experimental points thus obtained yield a curve such as the one shown in FIG. 8, which is a function $y=f(x)$ under the operating conditions existing at that time. The operator will be able to grasp the current operating conditions of the splicing device, in terms of the discharge current and the resulting discharge heat energy, more accurately using such an updating function $y=f(x)$.

It is also possible to obtain an intermediate value of discharge heat energy from the device performance curve $y=f(x)$; for example, if it is necessary to fusion splice so that the discharge heat energy y=0.18, the graph yields a discharge current x=17.2 mA.

Also, if additional heating to be repeated may times, a number of offset reduction factors obtained at a constant discharge current x may be averaged to obtain a more accurate operational data by reducing the experimental scatter in the measurements of discharge heat energy at a given current x.

For example, as in the example described above, a spliced joint is prepared using D0 at 20 μm, which produces D1 at 17 μm. Additional heating is carried out on this spliced joint using a discharge current x1 at 10 mA. The resulting offset reduction factor is assumed to be 0.062. A second additional heating is also carried out at the same current x1 at 10 mA, obtaining an offset reduction factor of 0.065. A third additional heating at x1=10 mA produces a y=0.068. An average of the three y yields 0.065. This is the correct value of discharge heat energy produced using the current x1=10 mA. Therefore, measurement precision is improved.

Next, another method of measuring the discharge heat energy will be explained.

When the optical fiber has eccentric core, the intentional cladding axes offset is produced automatically by the ECF function in a normal splicing process, not in the calibrating process described as the above. The optical fibers 10 are aligned with the cladding axes offset D0 as shown in FIG. 7A before the normal splicing process.

Next, a high frequency discharge fuses the optical fibers 10, and the cladding axes offset is reduced to D1 by the surface melting tension during the normal splicing process with the ECF function as shown in FIGS. 7B and 7C.

After observing D0 before splicing and D1 after splicing, discharge heat energy can be measured and calibrated by using the offset reduction factor (D0–D1)/D0 for a next normal splice process. When the optical fiber has eccentric core, it is possible to calibrate the arc power during the normal splicing process, and any special calibrating cycle is not required. As a result, observing the offset reduction factor in the ECF splicing process can keep the constant heat discharge energy.

Here, in these methods of measurement, it was stated that the discharge heat energy is dependent only on the discharge current, however, even if the discharge current is the same, longer duration of discharging would naturally result in a change of discharge heat energy, therefore, discharge heat energy may be expressed as a function of discharge current multiplied by discharging duration. Therefore, it is possible to replace the discharge current x as a parameter with discharging duration or with a product of discharge current.

What is claimed is:

1. A method of calibrating discharge heat energy used in an optical fiber fusion splicing device wherein a discharge heating energy is measured based on a change of the fiber cladding axes offset that is produced intentionally with a fiber aligning mechanism, comprising:

abutting the two optical fibers with fiber cladding axes dislocated;

performing discharge heating so as to produce a first fused joint exhibiting a residual axes offset; and subjecting the first fused joint to a series of successive additional discharge heating steps while the each discharge heat energy is measured at additional discharge heating processes from a change of the fiber cladding axes offset due to additional discharge heating, wherein a fusion spliced joint having a fiber cladding axes offset is heated additionally and successively under a constant level of discharge heat energy so as to measure the axes offset after each additional heating to obtain an average value of discharge heat energy in one calibration cycle.

2. A method of calibrating discharge heat energy used in an optical fiber fusion splicing device wherein a discharge heating energy is measured based on a change of the fiber cladding axes offset that is produced intentionally with a fiber aligning mechanism, comprising:

abutting the two optical fibers with fiber cladding axes dislocated;

performing discharge heating so as to produce a first fused joint exhibiting a residual axes offset; and subjecting the first fused joint to a series of successive additional discharge heating steps while the each discharge heat energy is measured at additional discharge heating processes from a change of the fiber cladding axes offset due to additional discharge heating, wherein a fusion spliced joint having a fiber cladding axes offset is heated on one fused joint additionally and successively under a plurality of levels of discharge heat energy so as to measure the axes offset after each additional heating to obtain a calibrating function of the plurality of levels of discharge heat energy and discharge current in one calibration cycle.

* * * * *